Figure 1:
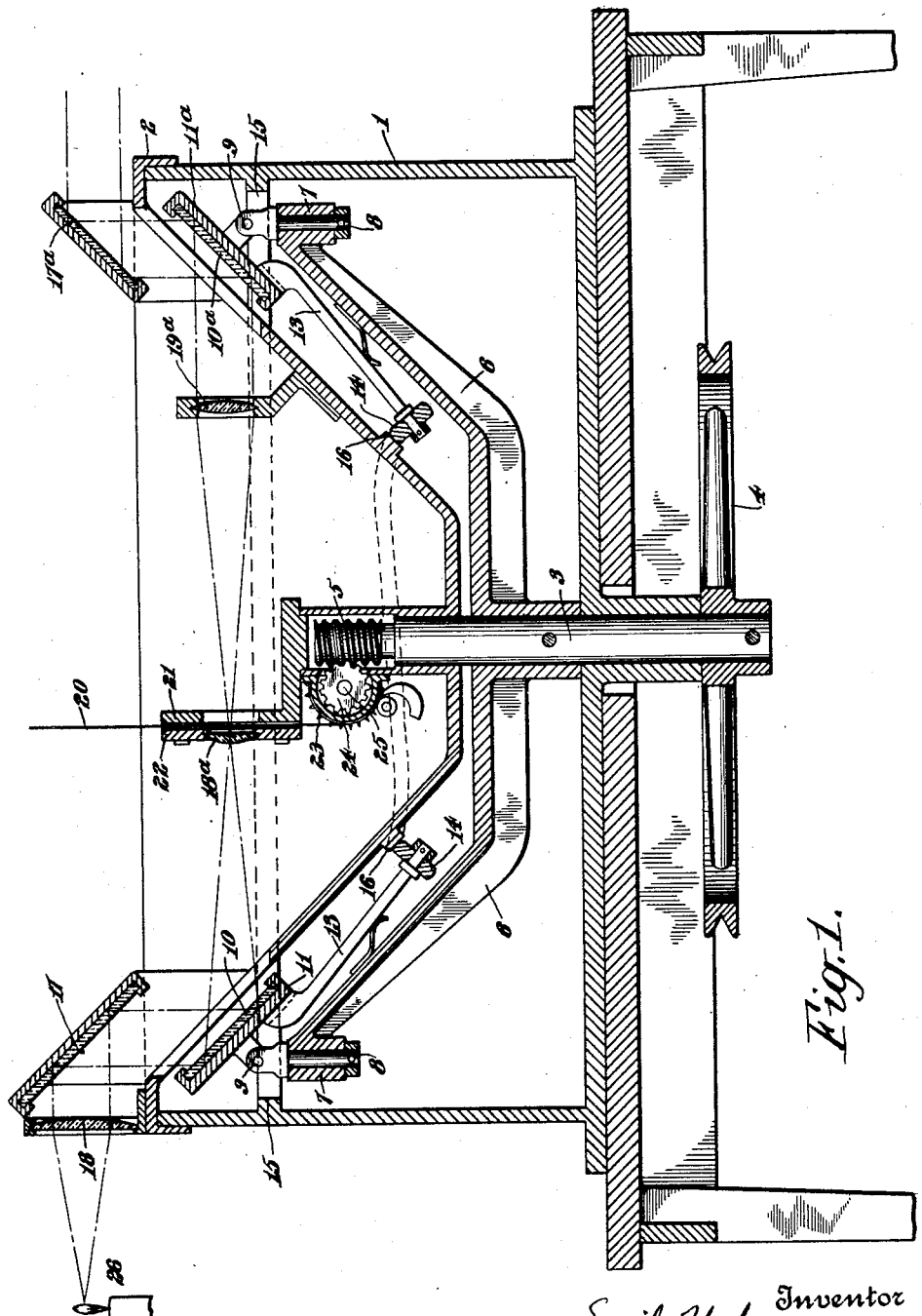

E. MECHAU.
MOTION PICTURE PROJECTION APPARATUS.
APPLICATION FILED SEPT. 2, 1921.

1,401,346.

Patented Dec. 27, 1921.
2 SHEETS—SHEET 1.

Inventor
Emil Mechau
By his Attorney
Richard Eyre

E. MECHAU.
MOTION PICTURE PROJECTION APPARATUS.
APPLICATION FILED SEPT. 2, 1921.

1,401,346.

Patented Dec. 27, 1921.

2 SHEETS—SHEET 2.

Emil Mechau Inventor
By his Attorney Richard Eyre

UNITED STATES PATENT OFFICE.

EMIL MECHAU, OF WETZLAR, GERMANY.

MOTION-PICTURE-PROJECTION APPARATUS.

1,401,346.          Specification of Letters Patent.      Patented Dec. 27, 1921.

Application filed September 2, 1921. Serial No. 498,009.

*To all whom it may concern:*

Be it known that I, EMIL MECHAU, a citizen of Germany, residing at Wetzlar, Germany, have invented certain new and useful Improvements in Motion-Picture-Projection Apparatus, (Case 2,) (and for which I have filed application in Germany, October 13, 1919; England, October 13, 1920; Belgium, October 11, 1920; France, October 8, 1920; Italy, October 12, 1920; Holland, October 16, 1920; Austria, October 13, 1920, and Switzerland, September 22, 1920,) of which the following is a specification.

My invention relates to apparatus for reproducing moving pictures with a continuously moving film in which optical devices consisting of catoptric elements are used both in front of and behind the film, in order to achieve the double purpose of compensating for the picture movements and of regulating the path of the rays during the picture or element change.

Heretofore the practical application of such an apparatus has been found to abound in difficulties, for the combination of two such simple optical devices, consisting of catoptric elements, does not necessarily lead to the solution of the problem of producing a suitable and simple complete apparatus. It is well known that only such optical elements and their corresponding film picture should be struck by the same beams of light. It has been suggested therefore to make the effective optical elements of both devices intersect the path of the rays in conjugate planes and to arrange that the image of a "joint" between two optical elements situated in the path of the rays in front of the film, is exactly coincident with the joint between two elements situated behind the film, this coincidence lasting throughout the time of change of the picture or element. The words "in front of" and "behind" the film are defined with respect to the direction of motion of the light rays. The practical application of this joint registration is attended with considerable difficulty, especially when all the optical elements are combined into one single device, in which case the same elements are made to intersect the path of the rays alternately in front of and behind the film.

The novel combination thus suggested certainly promises to an extraordinary degree the attainment of the desired suitable and simple complete apparatus, but on the other hand the necessity for joint registration imposes considerably higher demands on the optical devices as regards their suitability for a proper regulation of the path of the rays. Difficulties hitherto unknown make this joint registration almost impossible in those instruments previously acclaimed as the most practical, namely, those in which all the elements are secured to a single axis of rotation. Combining the optical elements into one device at once determines in such instruments their direction of action relative to the path of the film and their direction of passage through the path of the rays. For instance, if the actions of the optical elements relative to the film path are brought into agreement, say by inserting fixed reflecting surfaces, the direction of passage of one joint will not agree with the direction of motion of the image of the other joint, or, conversely, the actions of the elements relative to the film path are contradictory when the requirements of the regulation of the ray path or of the joint registration have been fulfilled.

The chief object of the present invention is to make the actions of the elements relative to the film path agree although the regulation of the ray path and the joint reproduction are both fulfilled, at the same time maintaining a simple complete apparatus. This object can be achieved by means of an improvement and extension of a device which has already been suggested for the solution of the problem of optical compensation alone. This device consists in means to give to the catoptric elements a suitable oscillating action relative to the path of the film, independent of their direction of passage through the path of the rays, that is, independent of their rotation around a common central axis. The only essential condition is this oscillation in the path of the rays. When used for the purpose of optical compensation alone this device does not constitute any advance on other well known much simpler devices in which compensation was obtained by the use of non-oscillating elements because of the increased use of technical means. It has therefore obtained only a small importance in patent literature and none at all in practice. But in the present invention this increased use of technical means is amply justified by the considerable advantage it provides. When reflecting elements oscillatorily fixed to a single axis of rotation are used for compensating for the picture movement, the oscillation axis of each element is usually arranged parallel to the common axis of rotation. The joints between the elements are then also parallel to the oscillation axis. When mirrors silvered on the back surfaces are used, this arrangement causes at each passage a loss of light which is the greater, that is, a flickering which is the stronger, the thicker are the mirrors. In order to reduce this loss to a reasonable quantity it has hitherto been necessary to use either thin mirrors, which are difficult to manufacture, or front surface silvering for the mirrors, which is not durable. Further, if a ring of such mirrors is used externally, then besides this defect fixed reflections between the elements are unavoidable and the apparatus becomes very large, while if used internally, there is a distinct scarcity of room inside.

Such defects are avoided in the present invention by arranging the oscillation axes in a different manner relative to the common axis of rotation. More particularly the joints between the elements can then be led through the ray path, in spite of the use of thick mirrors with back surface silvering without undue loss of light. According to this invention, the geometrical oscillation axes of single elements are no longer arranged parallel to the common axis of rotation as hitherto, but as far as possible in a plane perpendicular to the axis of rotation, that is, in a plane of rotation. Although in principle any intermediate position may be used, it is preferable to let these oscillation axes revolve as far as possible in planes of rotation as is, for example, illustrated in the construction according to the present invention shown in the drawings. During the time each element is passing through the ray path the corresponding oscillation is so guided by suitable mechanical means that during the rotation it is given a parallel movement maintaining a suitable fixed direction so that no twisting of the plane of reflection can occur. Unlike the normal arrangements the process relative to the common axis of rotation thus becomes three-dimensional or one in space. In carrying out such an oscillation in practice it is important that the elements may be free to move in any direction. Each element therefore, as a further feature of the invention, is connected to the axis of rotation through a Cardan or ball-and-socket joint. The oscillation of the elements is most simply effected by constraining them along curves during their rotation. For this purpose separate curves can be provided for each element, or as in the construction illustrated, common curves for all. In the latter case the curve is particularly simple, namely, a circle.
In the accompanying drawings a case is illustrated, by way of example, in which the optical elements are connected to the common axis of rotation by means of a Cardan joint.

Figure 2:
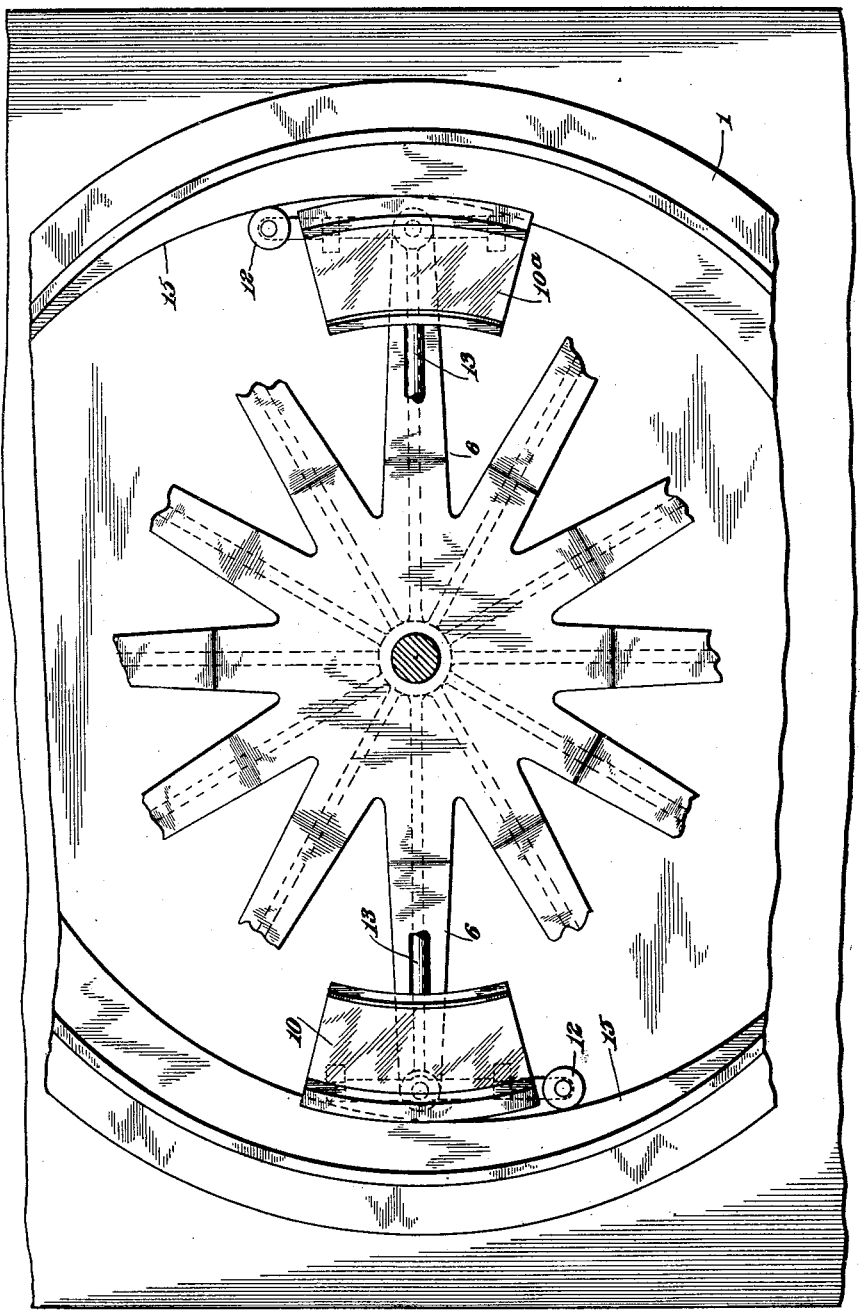

Figure 1 is a central section, and
Fig. 2 a plan view of a part of the apparatus.

For the sake of simplicity the oscillation axes are all arranged in one plane of rotation. The example also shows that it is possible, as a consequence of the special suitability of catoptric elements, to avoid the use of fixed mirrors or prisms between the optical elements without disadvantage, and, further, that only a minimum number of wheels is necessary to transmit the rotation of the axis to the film sprocket under the projection window. In order better to show the essential parts of the invention the casing cover with all the parts fixed to it is assumed to be removed in the plan. Only two essential optical elements are illustrated and described. The others can be easily supplied by a simple process of repetition.

Referring to the figures, a round casing 1 having a cover 2 incloses a rotatably mounted vertical spindle 3. This spindle carries at the bottom a wheel 4 for the motor drive and ends at the top in a worm wheel 5. Arms 6 are secured to the spindle 3 between the bearings and their other ends support T-pieces 7. The vertical branch of each of these T-pieces carries a spindle 8 which is rotatable on an axis parallel to that of the spindle 3. Each horizontal branch carries, at right angles to that spindle, another spindle 9, about which can be oscillated mirrors 10 and 10$^a$ silvered on the back and held in mounts 11 and 11$^a$. These horizontal branches carry rollers 12 (Fig. 2) on an extension. To the mirror mounts are fixed rods 13, on the ends of which are also mounted rollers 14. The mirrors 10 and 10$^a$ are thus connected by a Cardan joint to the common axis of rotation 3, that is, they are free to move in any direction relative to it. In order to control the positions of the mirrors, the rollers 12 are pressed by springs against an annular projection 15 of the wall of casing and the rollers 14 against a second, also annular, projection 16 on the cover of the casing. To the cover 2 are firmly fixed auxiliary mirrors 17 and 17$^a$, condensing lenses 18 and 18$^a$ and objective 19$^a$. In the center the film is guided between a fixed frame 21 and a gate 22 toward a two-sectioned toothed sprocket 23. The frame and the gate are each provided with the usual projection window. The driving of the sprocket is effected by the worm wheel 5 through a second worm wheel 24 arranged between the toothed rims of the sprocket 23 and fixed, together with the said toothed rims, to a spindle 25.

The lens 18 produces an image of a source of light 26 on the film portion situated in the window and an image of both is projected on the screen by the objective 19. The process follows the chain lines in the drawing. The planes of reflection then coincide with the plane of the drawing. Supposing that a sufficient number of similarly held mirrors are grouped about the axis 3 and then turned about it, the said mirrors will then be consecutively switched in and out of the path of the rays, first on one side and then on the other side of the film. A suitable gearing of the wheels 5 and 24 insures that in a unit of time the same number of film pictures and mirrors intersect the path of the rays. The lens 18ª is provided so as to complete the action of the objective 19 and to produce on one mirror the image of the other. In order to insure coincidence of mirror and image during the rotation for at least as long as they remain in the path of the rays, a suitable enlargement provides for the corresponding circumferential speed.

This optical relation between the points of passage of the elements through the ray path is, as well known, of great importance in connection with the time of change of the picture during which a false travel of any single part of the pencil of rays must be prevented. The movement of the mirrors relative to the axis of rotation 3 is controlled by the curved shape of the annular projections 15 and 16 along which travel the rollers 12 and 14. In this arrangement the spindles 9 are in planes perpendicular to the spindle 3, that is, in Fig. 1 perpendicular to the plane of the drawing. In order to prevent any variation in the direction of the said spindles during the time the corresponding mirrors are passing through the ray path, those portions of the annular projection 15, on which the rollers 12 travel during the time in question, are formed into circles, the centers of which are at the same distance from the axis 3, as the rollers 12 are from the axes 8. The remainder of the projection is only intended so as to smooth one roller path into the other. The real deviation of the pencil of rays is then effected by a suitable shaping of the projection 16 in such a manner that the image of the source of light 26 projected on to the window, is moved downward with the speed of the film and, further, so that the mirrors acting between the film and the screen exactly compensate for these movements. The line about which the resultant oscillation of each element takes place coincides in this example with the axes 9 as a consequence of the use of the Cardan joint for connecting the element to the spindle of rotation 3 and of the suitable arrangement of the two axes of the said joint. As the axes 9 revolve in one plane about the axis of rotation 3, the two rotations can be brought about in a simple manner independently of each other.

Having thus described my invention, what I claim as new and desire to secure by Letters Patent is:

1. In a motion picture projection apparatus of the class employing a continuously moving film, a plurality of successively arranged similar catoptric elements having well-defined joints between them, means for moving the same to cause them to intersect the ray path consecutively and alternately in front of and behind the film and means for giving to each element an oscillatory movement in addition to the aforesaid movement across the ray path to cause all the light received by an element behind the film to be reflected to a single active element in front of the film and thereby cause the joint between two catoptric elements in front of the film to register with a joint between two elements acting behind the film during each picture change.

2. In a motion picture projection apparatus of the class employing a continuously moving film, catoptric elements, means for rotating the same to cause them to intersect the ray path alternately in front of and behind the film and means for simultaneously oscillating each element in two directions in addition to its rotary movement.

3. In a motion picture projection apparatus of the class employing a continuously moving film, catoptric elements, means for rotating the same to cause them to intersect the ray path alternately in front of and behind the film and means acting during each optical change for causing a simultaneous oscillation of each element, in addition to its rotary movement, to produce a resultant motion about a fixed axis angular to the axis of rotation.

4. In a motion picture projection apparatus, means for continuously moving the picture film, a rotatable member carrying a series of supports surrounding the active portion of said film, a series of compensating catoptric elements movably mounted on said supports and adapted to intersect the path of the light rays on each side of the film, and means for oscillating said elements upon said supports while they intersect the path of the light rays on each side of the film.

5. In a motion picture projection apparatus, means for continuously moving the picture film, a rotatable member carrying a series of supports surrounding the active portion of said film, a series of compensating catoptric elements movably mounted on said supports, and means for oscillating said elements simultaneously in two directions upon the said supports while they intersect the light rays on each side of the film.

6. In a motion picture projection apparatus, means for continuously moving the picture film, a movable frame, a series of supports carried thereby and adapted to be consecutively moved into operative relation to the active portion of the film, means for continuously moving said frame and supports, a catoptric element carried on each support on rotatable pintles at an angle to each other, fixed guiding surfaces, and rollers respectively engaging the same to control the movement of the respective pintles.

7. In a motion picture projection apparatus of the class employing a continuously moving film, a plurality of catoptric elements moving synchronously with the film and intersecting the ray path between the source of light and the moving film and the ray path between the film and the screen and means for giving to the elements as they intersect the ray path between the light source and the film a second movement corresponding to the moving film for causing a concentrated light beam to follow each individual picture as it passes through the optical axis of the system.

8. In a motion picture projection apparatus of the class employing a continuously moving film, a plurality of catoptric elements, means for moving the same to cause them to intersect the ray path alternately in front of and behind the film and means for giving to each element an oscillatory movement in addition to the aforesaid movement as it passes between the light source and the film to cause a concentrated light beam to follow each individual picture as it passes through the optical axis of the system.

9. In a motion picture projection apparatus of the class employing a continuously moving film, a plurality of catoptric elements, means for moving the same to cause them to intersect the ray path between the light source and the moving film and a fixed optical system coöperating with said moving film and said moving catoptric elements comprising a collecting lens disposed in the path from the source of light to the catoptric elements and a second lens coöperating therewith disposed closely adjacent the moving film and on the opposite side of the moving catoptric elements from the first-named lens and means for giving to each of said catoptric elements an oscillating movement corresponding to the moving film for causing the concentrated light beam to follow each individual picture at it passes through the optical axis.

10. In a motion picture projection apparatus, means for continuously moving the picture film, a movable frame, a series of supports carried thereby and adapted to be moved consecutively in operative relation to the active portion of the film, means for continuously moving said frame and supports across the ray path, a catoptric element carried on each support and having two oscillatory movements at an angle to each other, one of said movements corresponding to the movement of the picture film and causing each of the moving pictures to be maintained in operative relation with the optical system while the pictures are passing through the active path.

In testimony whereof, I have signed my name to this specification.

EMIL MECHAU.